United States Patent
Cur et al.

(10) Patent No.: US 10,746,458 B2
(45) Date of Patent: *Aug. 18, 2020

(54) METHOD OF MAKING A FOLDED VACUUM INSULATED STRUCTURE

(71) Applicant: WHIRLPOOL CORPORATION, Benton Harbor, MI (US)

(72) Inventors: Nihat Cur, Saint Joseph, MI (US); Axel Julio Ramm, Saint Joseph, MI (US); Guolian Wu, Saint Joseph, MI (US); James Kendall, Mount Prospect, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/797,217

(22) Filed: Oct. 30, 2017

(65) Prior Publication Data

US 2018/0045456 A1 Feb. 15, 2018

Related U.S. Application Data

(60) Continuation of application No. 14/635,313, filed on Mar. 2, 2015, now Pat. No. 9,874,394, which is a
(Continued)

(51) Int. Cl.
*F25D 23/06* (2006.01)
*F25D 23/02* (2006.01)
(Continued)

(52) U.S. Cl.
CPC ............ *F25D 23/065* (2013.01); *B23P 15/26* (2013.01); *B29C 53/00* (2013.01); *F25B 39/00* (2013.01);
(Continued)

(58) Field of Classification Search
None
See application file for complete search history.

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

Kitchen Aid, "Refrigerator User Instructions," 120 pages, published Sep. 5, 2015.
(Continued)

*Primary Examiner* — Barbara J Musser
(74) *Attorney, Agent, or Firm* — Price Heneveld LLP

(57) ABSTRACT

A vacuum insulated cabinet structure includes panels having sheet metal outer side walls and polymer inner side walls. The polymer inner side walls are heat-sealed to a layer of polymer material laminated to a flat sheet metal blank to form vacuum cavities. The blank is then bent along fold lines to form a cabinet structure.

14 Claims, 10 Drawing Sheets

Related U.S. Application Data division of application No. 13/837,659, filed on Mar. 15, 2013, now Pat. No. 8,986,483.

(60) Provisional application No. 61/618,914, filed on Apr. 2, 2012.

(51) Int. Cl.
    *F25B 39/00*     (2006.01)
    *F25D 11/00*     (2006.01)
    *B29C 53/00*     (2006.01)
    *H04R 3/12*     (2006.01)
    *F25B 39/02*     (2006.01)
    *F25C 1/00*     (2006.01)
    *B23P 15/26*     (2006.01)

(52) U.S. Cl.
CPC .............. *F25B 39/02* (2013.01); *F25C 1/00* (2013.01); *F25D 11/00* (2013.01); *F25D 23/028* (2013.01); *F25D 23/062* (2013.01); *F25D 23/063* (2013.01); *F25D 2201/14* (2013.01); *Y10T 29/49002* (2015.01); *Y10T 29/49359* (2015.01); *Y10T 29/49616* (2015.01); *Y10T 29/49826* (2015.01); *Y10T 29/49879* (2015.01); *Y10T 29/49947* (2015.01); *Y10T 156/1051* (2015.01); *Y10T 428/231* (2015.01)

(56) References Cited

U.S. PATENT DOCUMENTS

| | | |
|---|---|---|
| 1,849,369 A | 3/1932 | Frost |
| 1,921,576 A | 8/1933 | Duffy |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,110,754 A * | 11/1963 | Witort .................. H02G 3/0616 174/70 R |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,118,266 A | 10/1978 | Kerr |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schiff |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A | 8/1990 | Ferrario et al. |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,399,812 A * | 3/1995 | Woszczyna ......... B60R 16/0215 138/115 |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |

(56) References Cited

U.S. PATENT DOCUMENTS

| | | |
|---|---|---|
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell et al. |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Messer et al. |
| 5,827,385 A | 10/1998 | Meyer et al. |
| 5,834,126 A | 11/1998 | Sheu |
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,037,033 A | 3/2000 | Hunter |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Asian et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 * | 5/2001 | Wenning ............... F24C 15/34 312/406 |
| 6,244,458 B1 | 6/2001 | Frysinger et al. |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 * | 1/2010 | Hirath ............... F24C 15/08 312/401 |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,486,215 B2 | 7/2013 | Amann |
| 8,491,070 B2 | 7/2013 | Davis et al. |
| 8,516,845 B2 | 8/2013 | Wuesthoff et al. |
| 8,522,563 B2 | 9/2013 | Allard et al. |

(56) References Cited

U.S. PATENT DOCUMENTS

| | | | |
|---|---|---|---|
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,809,682 B2 * | 8/2014 | Hepfinger ............ H02G 9/065 138/115 |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Curr et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,752,818 B2 * | 9/2017 | Naik .................. F16L 7/00 |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,927,169 B2 | 3/2018 | Baker et al. |
| 9,976,753 B2 | 5/2018 | Hynes |
| 10,024,544 B2 | 7/2018 | Bhogal et al. |
| 10,077,342 B2 | 9/2018 | An et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1 | 11/2012 | Katu et al. |

(56) References Cited

U.S. PATENT DOCUMENTS

| | | |
|---|---|---|
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 19948361 | 4/2001 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1344008 | 9/2006 |
| EP | 1484563 | 10/2008 |
| EP | 1338854 | 12/2009 |
| EP | 2342511 | 8/2012 |
| EP | 2543942 A2 | 1/2013 |
| EP | 2607073 | 6/2013 |
| EP | 2789951 | 10/2014 |
| EP | 2801774 | 11/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 1318880 | 12/1989 |
| JP | 03013779 | 1/1991 |
| JP | 404165197 | 6/1992 |
| JP | 04165197 | 10/1992 |
| JP | 06159922 | 6/1994 |
| JP | 7001479 | 1/1995 |
| JP | H07167377 | 7/1995 |
| JP | 8145547 | 6/1996 |
| JP | 08300052 | 11/1996 |
| JP | H08303686 | 11/1996 |
| JP | H09166271 | 6/1997 |
| JP | 10113983 | 5/1998 |
| JP | 04309778 A | 6/1999 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |

(56) References Cited

FOREIGN PATENT DOCUMENTS

| | | |
|---|---|---|
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 A | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 1999030964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2006120183 | 11/2006 |
| WO | 2006120198 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Cai et al., "Generation of Metal Nanoparticles by Laser Ablation of Microspheres," J. Aerosol Sci., vol. 29, No. 5/6 (1998), pp. 627-636.

Raszewski et al., "Methods for Producing Hollow Glass Microspheres," Powerpoint, cached from Google, Jul. 2009, 6 pages.

BASF, "Balindur™ Solutions for fixing Vaccum Insulated Panels," web page, 4 pages, date unknown, http://performance-materials.basf.us/products/view/family/balindur, at least as early as Dec. 21, 2015.

(56) References Cited

OTHER PUBLICATIONS

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

* cited by examiner

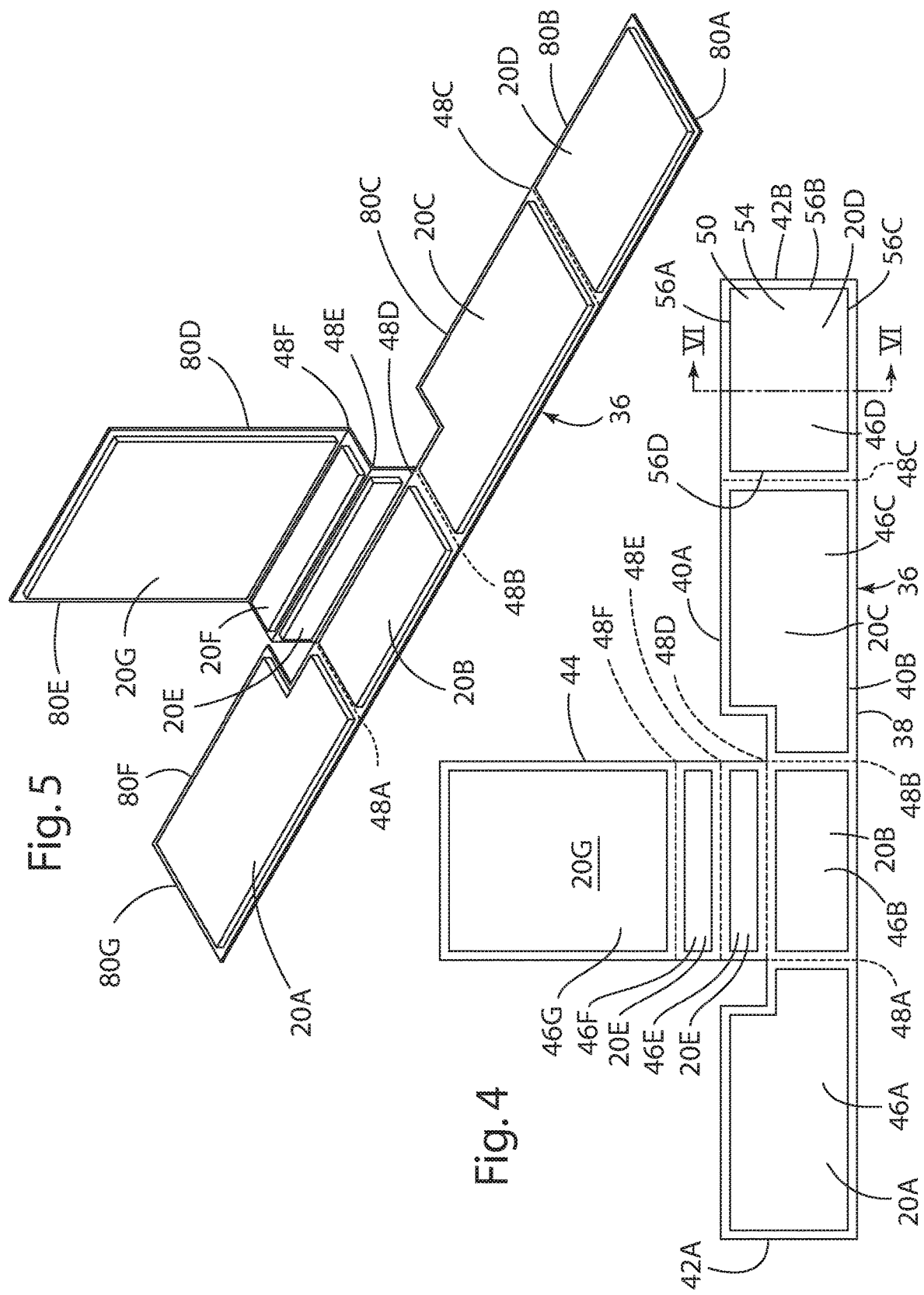

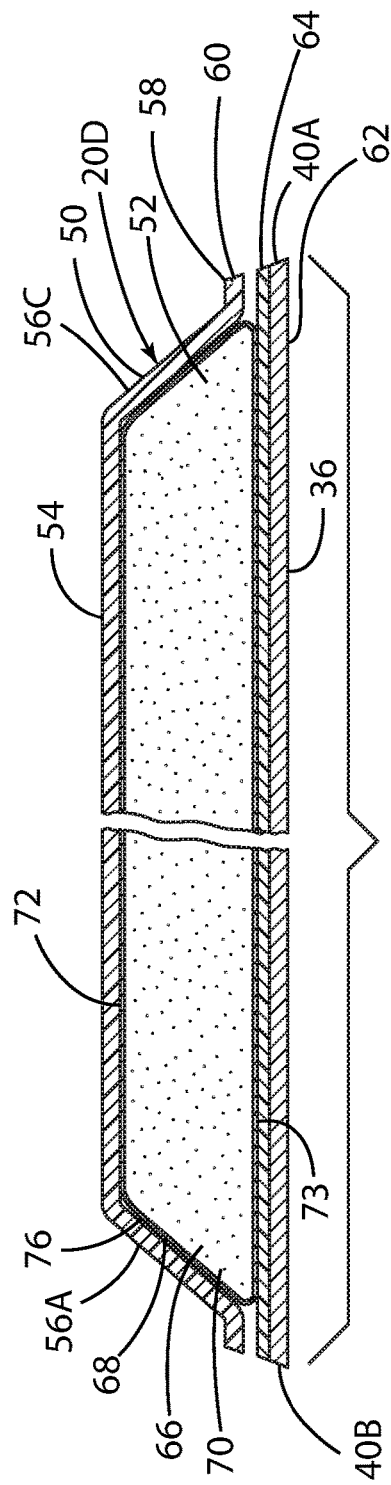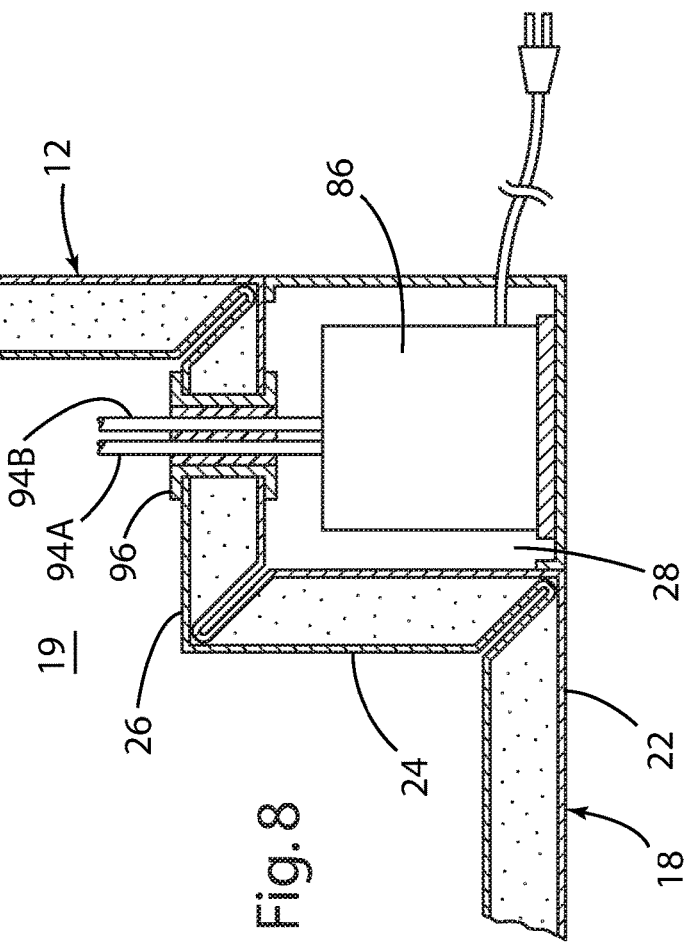

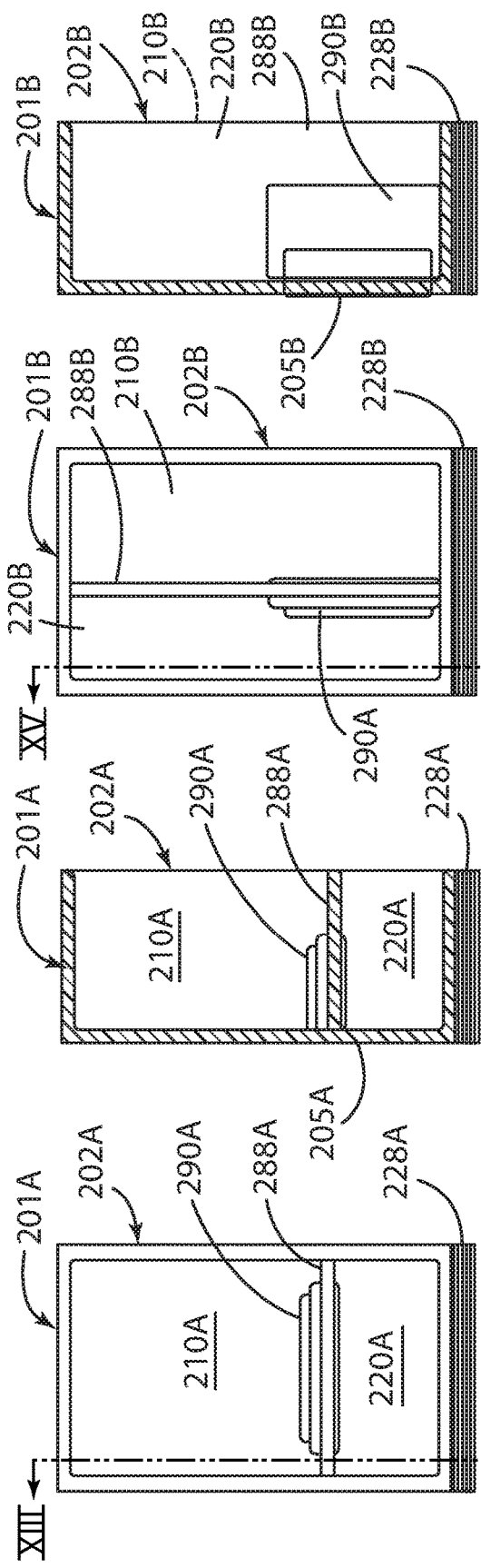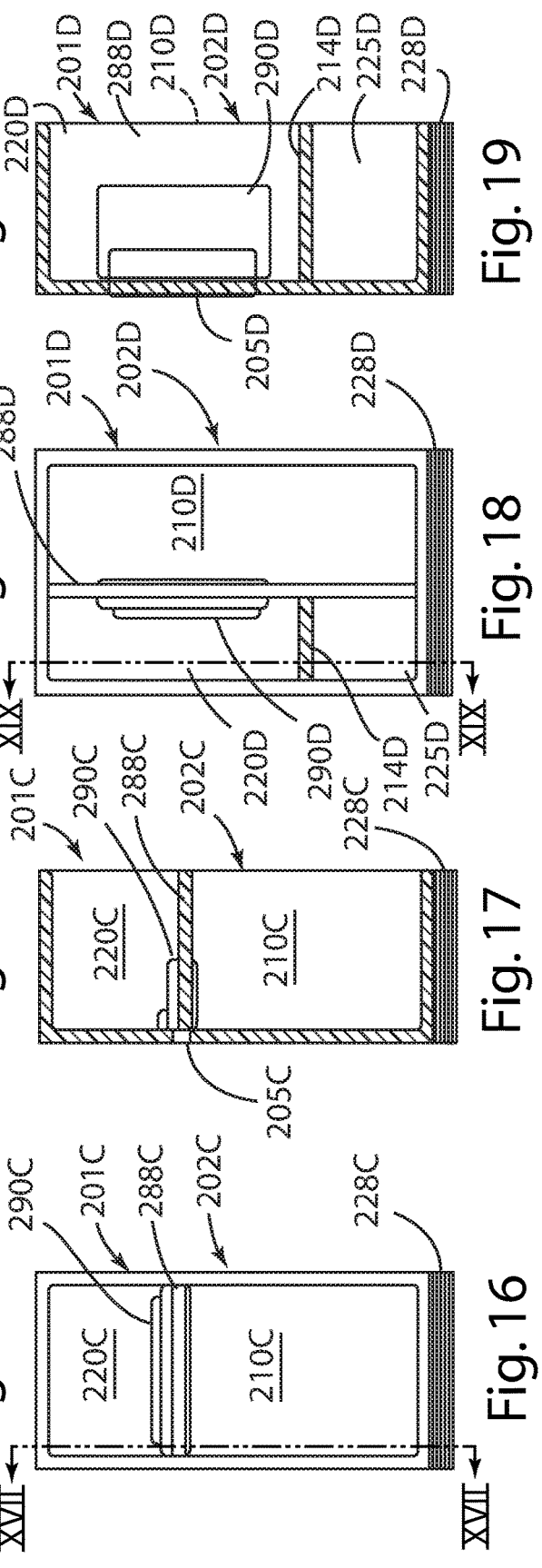

METHOD OF MAKING A FOLDED VACUUM INSULATED STRUCTURE

CROSS-REFERENCE TO RELATED APPLICATIONS

This application is a continuation of U.S. patent application Ser. No. 14/635,313 filed on Mar. 2, 2015, now U.S. Pat. No. 9,874,394, issued on Jan. 23, 2018, entitled "METHOD OF MAKING A FOLDED VACUUM INSULATED STRUCTURE," which is a divisional of U.S. Pat. No. 8,986,483 issued on Mar. 24, 2015, entitled "FOLDED VACUUM INSULATED STRUCTURE", which claims the benefit of U.S. Provisional Patent Application No. 61/618,914, filed on Apr. 2, 2012 and entitled "ENERGY EFFICIENT HOME APPLIANCES." This application is also related to U.S. patent application Ser. No. 13/833,635 filed on Mar. 15, 2013, entitled "A METHOD TO CREATE VACUUM INSULATED CABINETS FOR REFRIGERATORS,"; and U.S. Pat. No. 9,140,481 issued on Sep. 12, 2015, entitled "FOLDED VACUUM INSULATED STRUCTURE"; and U.S. Pat. No. 8,944,541 issued on Feb. 3, 2015, entitled "A VACUUM PANEL CABINET STRUCTURE FOR A REFRIGERATOR"; and U.S. Pat. No. 9,182,158 issued on Nov. 10, 2015, entitled "DUAL COOLING SYSTEMS TO MINIMIZE OFF-CYCLE MIGRATION LOSS IN REFRIGERATORS WITH A VACUUM INSULATED STRUCTURE"; and U.S. Pat. No. 9,038,403 issued on May 26, 2015, entitled "VACUUM INSULATED DOOR STRUCTURE AND METHOD FOR THE CREATION THEREOF"; and U.S. Pat. No. 9,071,907 issued on Jun. 30, 2015, entitled "VACUUM INSULATED STRUCTURE TUBULAR CABINET CONSTRUCTION"; and U.S. Pat. No. 9,221,210 issued on Dec. 29, 2015, entitled "METHOD TO CREATE VACUUM INSULATED CABINETS FOR REFRIGERATORS," all of which are incorporated herein by reference in their entirety.

BACKGROUND OF THE INVENTION

Various types of insulated cabinet structures for refrigerators, freezers, and the like have been developed. Known refrigerator cabinets may include inner and outer side walls with a layer of insulating material such as polyurethane foam disposed between the inner and outer side walls. The foam provides insulation for the cabinet structure. However, known cabinet constructions may suffer from various drawbacks.

SUMMARY OF THE INVENTION

One aspect of the present invention is a method of fabricating a refrigerator having a vacuum insulated cabinet. The method includes forming an outer cabinet skin blank, the blank including an elongated portion having a generally rectangular perimeter with elongated side edges and end edges extending between the side edges. The blank defines a plurality of fold lines extending between the side edges to define a plurality of generally planar panel regions. The outer cabinet skin blank comprises a sheet of material that includes a metal layer and an outer layer of polymer material on a first side of a sheet. The polymer material is preferably a heat sealable thermoplastic polymer material. The method further includes providing a plurality of pouches having porous filler material disposed in the pouches. The pouches are positioned on the first side of the outer cabinet skin blank to cover the panel regions. The method includes providing a barrier layer that forms a barrier with respect to gasses and water vapor sufficient to maintain a vacuum. The barrier layer may comprise EVOH, metal foil, or other suitable material that is laminated with a layer of thermoplastic polymer material. The barrier layer may be sealed to the layer of polymer material around the pouches utilizing a heat seal process, mechanical pressure, adhesives, or other suitable technique. The pouches are thereby sealed inside an air-tight space formed between the layer of heat sealable polymer material and the barrier layer. The method also includes forming a vacuum in the air-tight space, and folding the cabinet skin blank along the fold lines to form a vacuum insulated cabinet structure having upright outer side walls and a transverse wall extending between the outer side walls. The vacuum insulated cabinet structure may include a floor structure having a front portion and a raised rear portion that is elevated relative to the front portion to define an exterior component-mounting space that is separated from the insulated interior space. One or more components of an electrically-powered refrigeration system may be mounted in the component-mounting space.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a plan view of an outer cabinet skin blank;

FIG. 5 is an isometric view of the cabinet skin blank of FIG. 4 showing the formation of a floor structure and a back panel;

FIG. 6 is a cross-sectional view of the outer cabinet skin blank of FIG. 4 taken along the line VI-VI;

FIG. 8 is an enlarged view of a portion of the refrigerator of FIG. 7;

FIG. 12 is a front elevational view of a refrigerator cabinet having a divider that includes a cooling module;

FIG. 13 is a cross-sectional view of the insulated cabinet structure of FIG. 12 taken along the line XIII-XIII;

FIG. 14 is a front elevational view of a refrigerator cabinet having a divider wall that includes a cooling module;

FIG. 15 is a cross-sectional view of the insulated cabinet structure of FIG. 14 taken along line XV-XV;

FIG. 16 is a front elevational view of a refrigerator cabinet having a divider that includes a cooling module;

FIG. 17 is a cross-sectional view of the insulated cabinet structure of FIG. 16 taken along line XVII-XVII;

FIG. 18 is a front elevational view of a refrigerator cabinet having a divider that includes a cooling module; and FIG. 19 is a cross-sectional view of the insulated cabinet structure of FIG. 18 taken along the line XIX-XIX.

DETAILED DESCRIPTION

Figure 1:
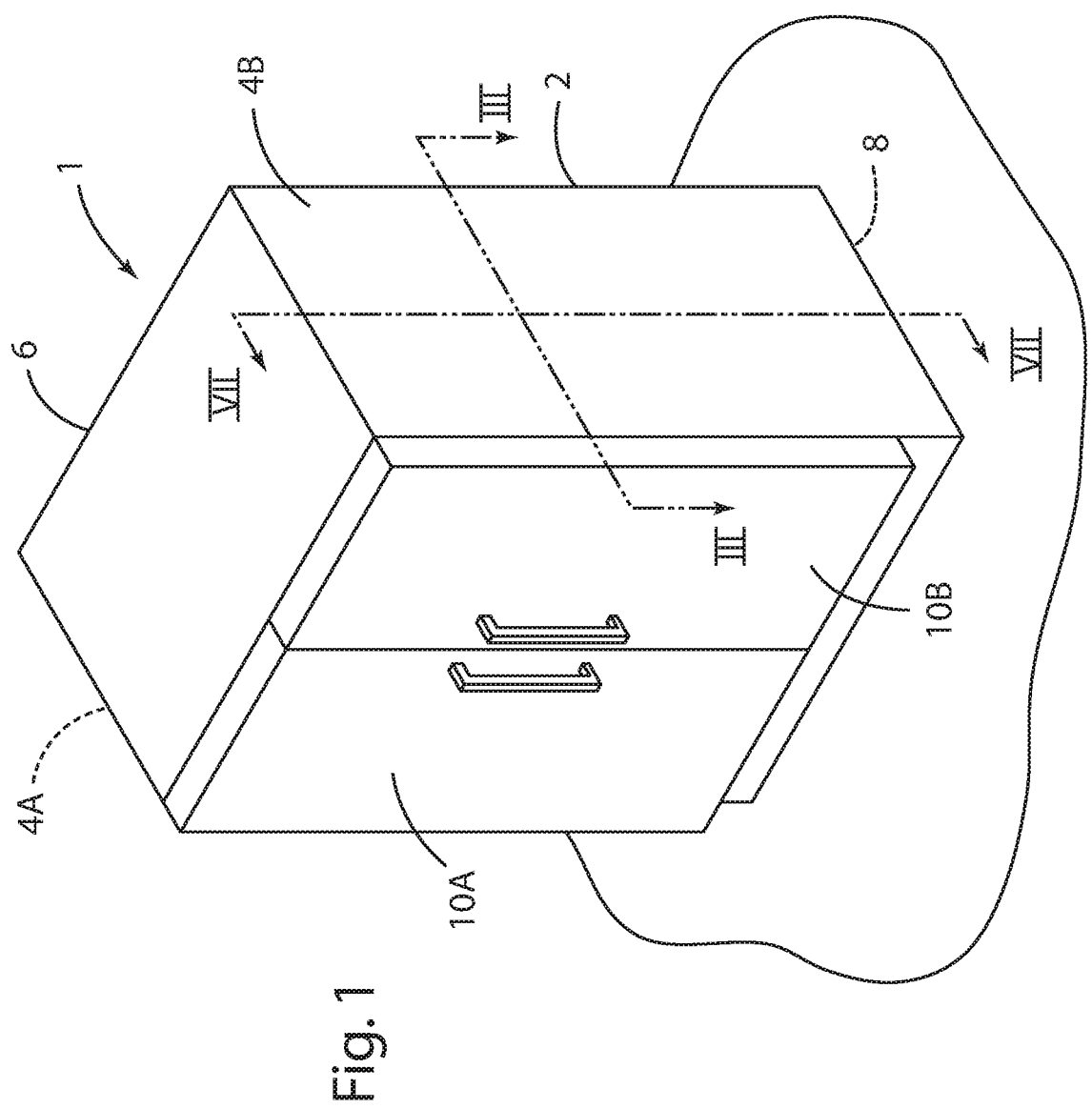
FIG. 1 is an isometric view of a refrigerator having a vacuum insulated cabinet structure according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a vacuum insulated cabinet structure 2. The vacuum insulated cabinet structure 2 includes upright side walls 4A and 4B, an upper horizontal wall 6, and a generally horizontal lower wall 8 (see also FIG. 2). Doors 10A and 10B are moveably mounted to the cabinet structure 2 in a known manner.

Figure 2:
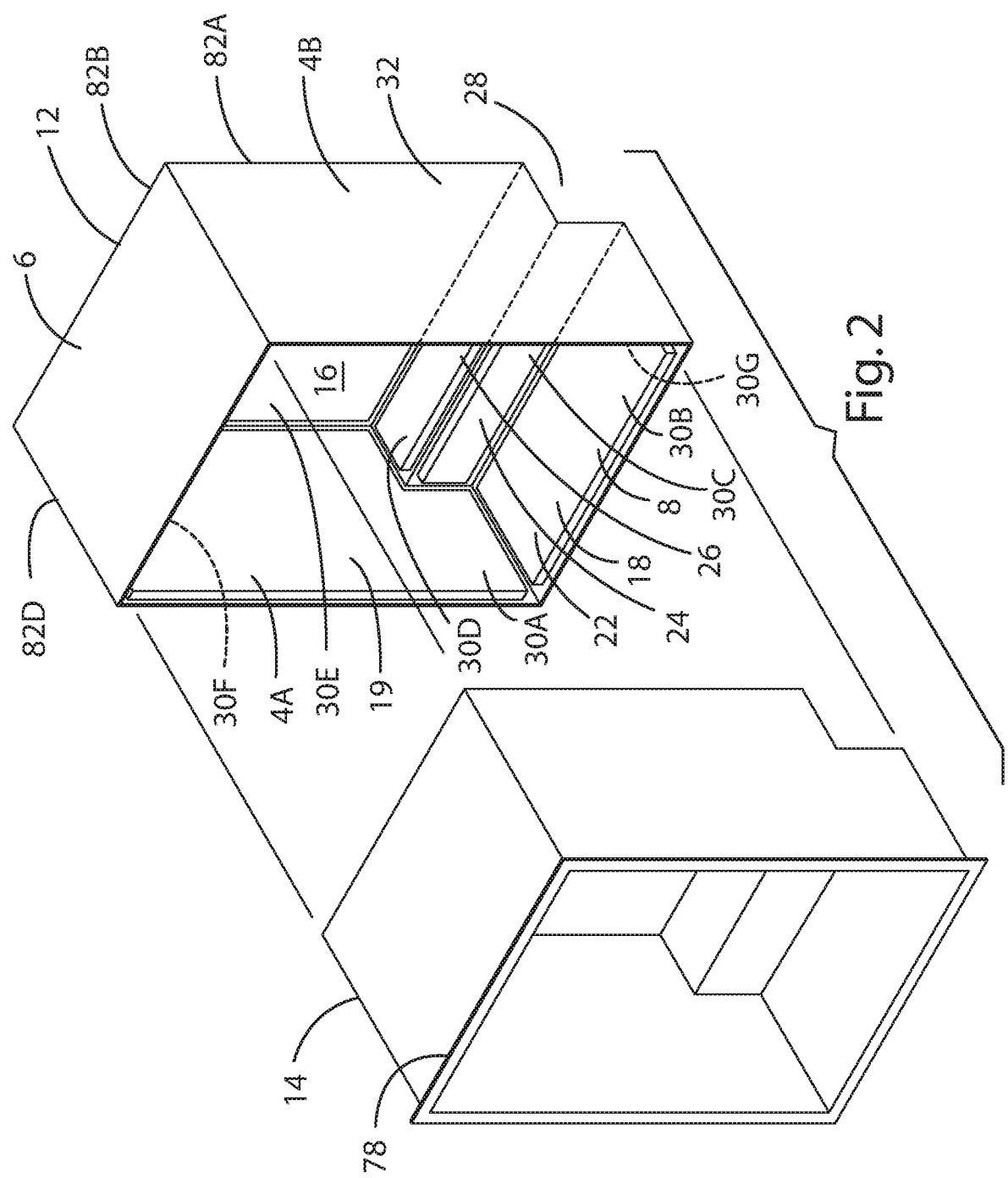
FIG. 2 is an exploded isometric view of a vacuum insulated cabinet structure and liner.

With further reference to FIG. 2, the vacuum insulated cabinet structure 2 may include a first cabinet structure or portion 12 and a liner 14. Liner 14 may be thermoformed from polymer material utilizing known materials and processes. As discussed in more detail below, the first portion 12 comprises sheet metal that is bent to form side walls 4A and 4B, upper horizontal wall 6, floor structure 18, and an optional rear wall 16. The first portion 12 defines an interior space 20 that receives liner 14. Insulating materials such as polyurethane foam may be injected between liner 14 and first portion 12.

As also discussed in more detail below, floor structure 18 includes a horizontal first portion 22, a vertical second portion 24, and a horizontal third portion 26. Third portion 26 is elevated relative to first portion 22 to define an exterior component mounting space 28 that may be utilized to mount a compressor and/or other cooling system components outside of insulated interior space 19 of vacuum insulated cabinet structure 2. The first portion 12 includes a plurality of vacuum insulated panels 30A-30G that are positioned on inner sides of metal outer layer 32 of first portion 12.

Figure 3:
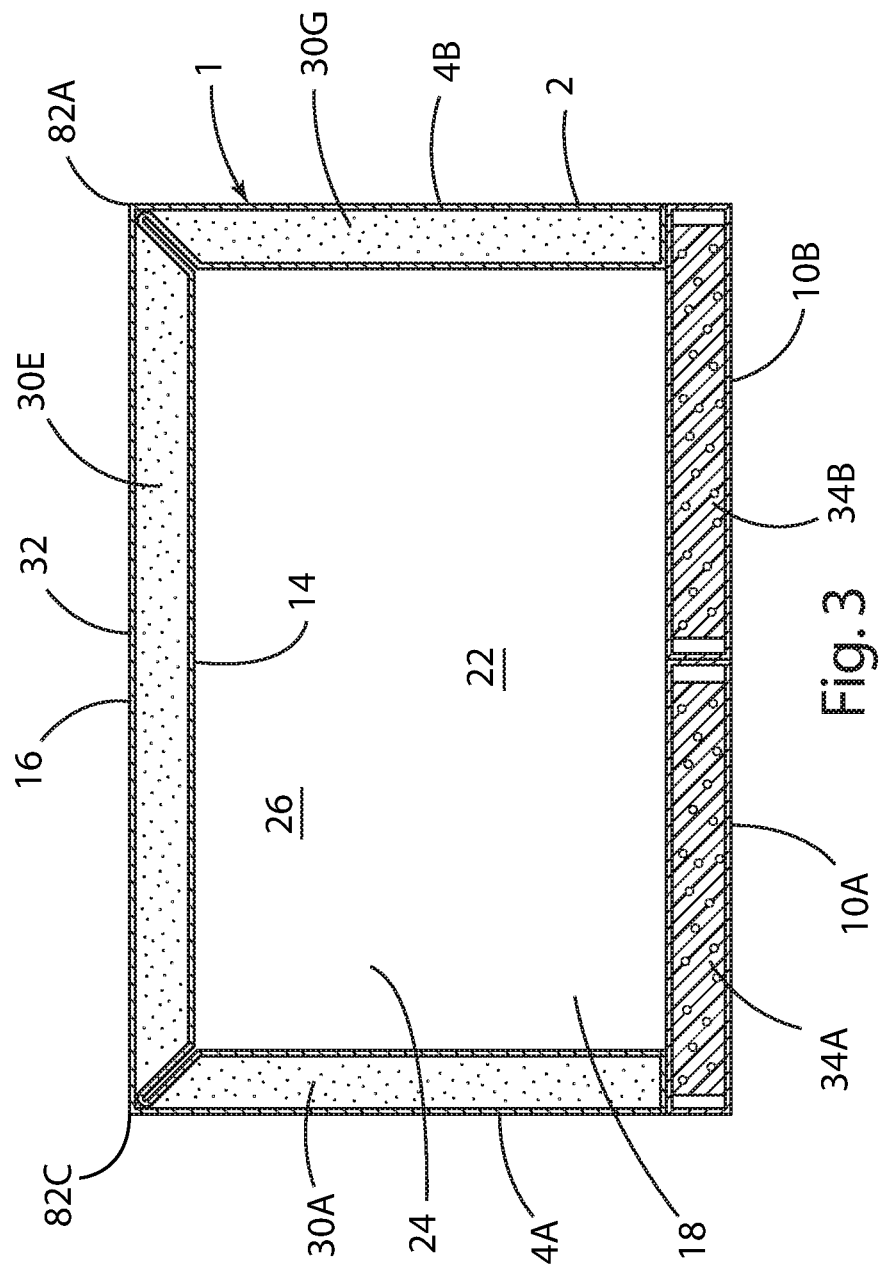
FIG. 3 is a cross-sectional view of the refrigerator of FIG. 1 taken along the line III-III.

With further reference to FIG. 3, the vacuum insulated panels 30A-30G are positioned between metal outer layer 32 of vacuum insulated cabinet structure 2 and the polymer inner liner 14. Doors 10A and 10B may be vacuum insulated in a manner that is substantially similar to the vacuum insulated cabinet structure 2, or the doors 10A and 10B may include a known insulation material suck as foam insulation 34A and 34B.

With reference to FIG. 4, during fabrication of vacuum insulated cabinet structure 2, a layer of sheet metal is cut to form a blank 36 having an elongated rectangular portion 38 defining elongated opposite edges 40A and 40B, and end edges 42A and 42B. The blank 36 may optionally include a transversely-extending portion 44 that is utilized to form rear wall 16 of first portion 12 of vacuum insulated cabinet structure 2.

The blank 36 includes a plurality of panel regions 46A-46G. The blank 36 also defines a plurality of fold lines 48A-48C extending between opposite side edges 40A and 40B to define the boundaries of panel regions 46A-46D. A plurality of fold lines 48D-48F extend between panel regions 46E-46G. It will be understood that the fold lines 48A-48F do not necessarily comprise actual lines marked on blank 36, but rather represent lines where the blank 36 is to be folded. When the blank 36 is in a flat, unfolded condition (FIG. 4), a plurality of vacuum insulated panels 20A-20G are formed on panel regions 46A-46G (see also FIG. 5).

With further reference to FIG. 6, insulated panel 20D includes a polymer retaining structure 50. The polymer retaining structure 50 is preferably thermoformed from a sheet of material that includes one or more layers of a thermoplastic material such as high impact polystyrene that is laminated to a barrier layer. The barrier layer may comprise ethylene vinyl alcohol (EVOH) or other material (e.g. metal foil) that forms a barrier with respect to gasses and water vapor. The barrier layer preferably retains a vacuum in vacuum space 52 sufficient to prevent the thermal conductivity of the insulated panels from exceeding a value that is 200% of an initial value for at least 10 years. The retaining structure 50 includes a planar main wall 54 and transversely extending side walls 56A-56D (see also FIG. 4). The polymer retaining structure 50 includes a flange 60 extending around retaining structure 50 to define a perimeter 58. The perimeter 58 (flange 60) of retaining structure 50 is configured to follow the contours of panel region 46A. It will be understood that the size and shape of each polymer retaining structure 50 depends on the size and shape of the panel region 46A-46G for which the polymer retaining structure 50 is configured.

The blank 36 is formed from a sheet of material having a metal layer 62 comprising low carbon steel or other suitable metal, and a heat sealable polymer layer 64 laminated to the metal layer 62. The polymer retaining structure 50 can be connected to the blank 36 by sealing the flange 60 to polymer layer 64 to thereby form the air-tight interior vacuum space 52. Flange 60 can be sealed to polymer layer 64 utilizing a heat sealing process, mechanical pressure, adhesives, or other suitable process. Prior to sealing polymer retaining structure 50 to blank 36, a plurality of pouches 66 are positioned on the panel regions 46A-46G. Pouches 66 comprise an outer layer 68, and filler material 70 that is disposed inside the outer layer 68. The filler material 70 may comprise silica powder or other suitable filler material of a type used in vacuum insulated panels. The outer layer 68 may comprise paper or other material that permits air to escape from inside the pouch 66, while retaining the filler material 70 inside the pouch 66. In general, the pouches 66 include outer sides 72, inner sides 73 and peripheral edge 76. The pouches 66 are relatively thin, and the edges 76 of the pouches 66 preferably have a shape that conforms to the shape of panel regions 46A-46G.

During fabrication of vacuum insulated cabinet structure 2, the pouches 66 are positioned on panel regions 46A-46G, and polymer retaining structures 50 are positioned over the pouches 66. The entire blank 36 may then be positioned within a vacuum chamber (not shown), and the flanges 60 of the polymer retaining structures 50 are then sealed to the heat sealable polymer layer 64 of blank 36 to form interior vacuum spaces 52, with pouches 66 being disposed within the interior vacuum spaces 52. The blank 36 can then be removed from the vacuum chamber. Although the entire flange 60 of each polymer retaining structure 50 may be sealed to polymer layer 64 in a vacuum chamber, the polymer retaining structure 50 can also be sealed to the polymer layer 64 along only a portion of flange 60 prior to positioning the blank 36 in a vacuum chamber. After the blank 36 is positioned within a vacuum chamber, the previously unsealed portion of flange 60 can then be sealed to polymer layer 64 in a vacuum chamber.

With reference to FIG. 5, after the vacuum insulated panels 20A-20G are formed, the blank 36 is deformed along fold lines 48A-48F to thereby form the first portion 12 (see also FIG. 2) of the vacuum insulated cabinet structure 2. Referring again to FIG. 6, the side walls 56A-56D of polymer retaining structure 50 may be angled inwardly as shown in FIG. 6 at an angle of approximately 45 degrees, such that the side walls 56 of adjacent panel regions 46A-46G are closely fitted against one another after folding of blank 36. However, some of the side walls 56 may be substantially orthogonal to the blank 36 if required. For example, with reference to FIG. 4, the side wall 56C of vacuum insulated panel 20D may be orthogonal because the side wall 56C is not adjacent a fold line, but rather fits closely adjacent a flange 78 (FIG. 2) of liner 14 when assembled.

Referring again to FIG. 5, after the blank 36 is folded along the fold lines 48A-48F, the edges of the blank 36 can be interconnected by welding, deforming, or other suitable process to form corners 82A-82C (FIGS. 2 and 3). Referring again to FIG. 2, liner 14 can then be inserted into space 19 of first portion 12 of vacuum insulated cabinet structure 2. Polyurethane foam or the like may be injected between liner 14 and first cabinet structure 12 to fill gaps that may remain along the edges of vacuum insulated panels 20.

Figure 7:
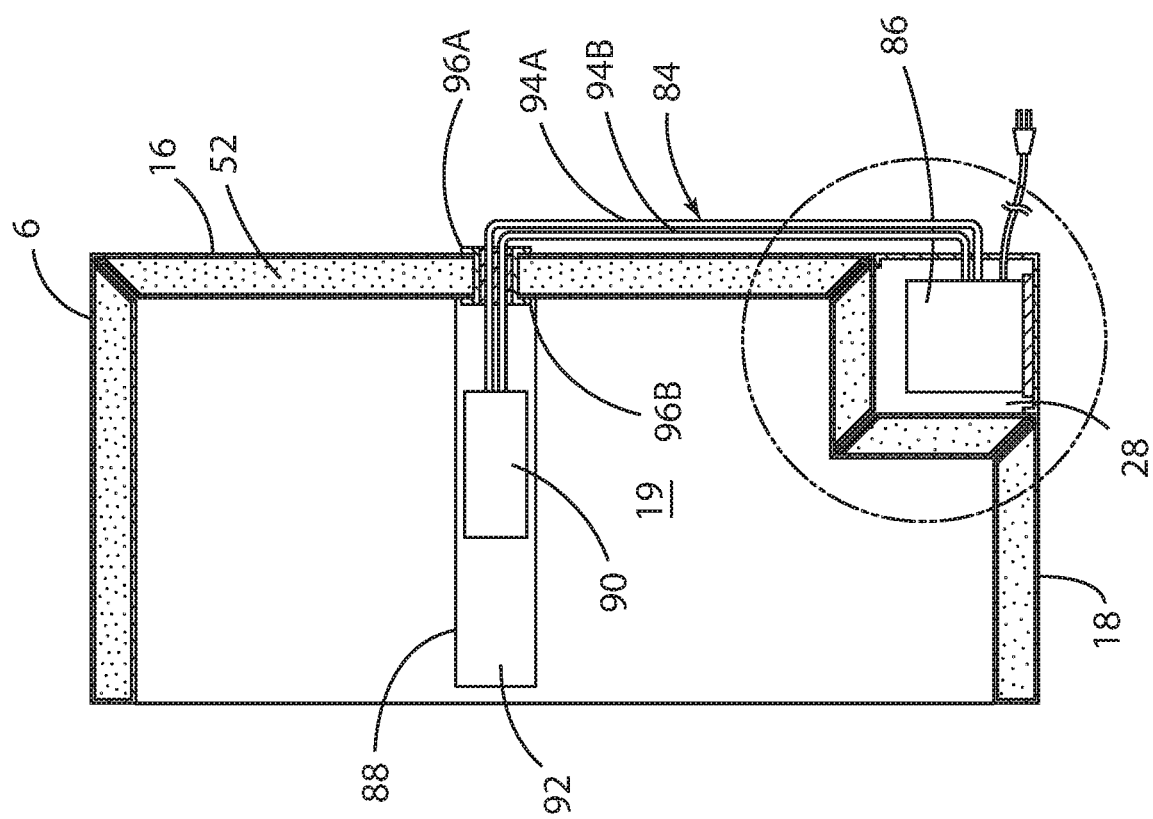
FIG. 7 is a cross-sectional view of the refrigerator of FIG. 1 taken along the line VII-VII.
Figure 9:
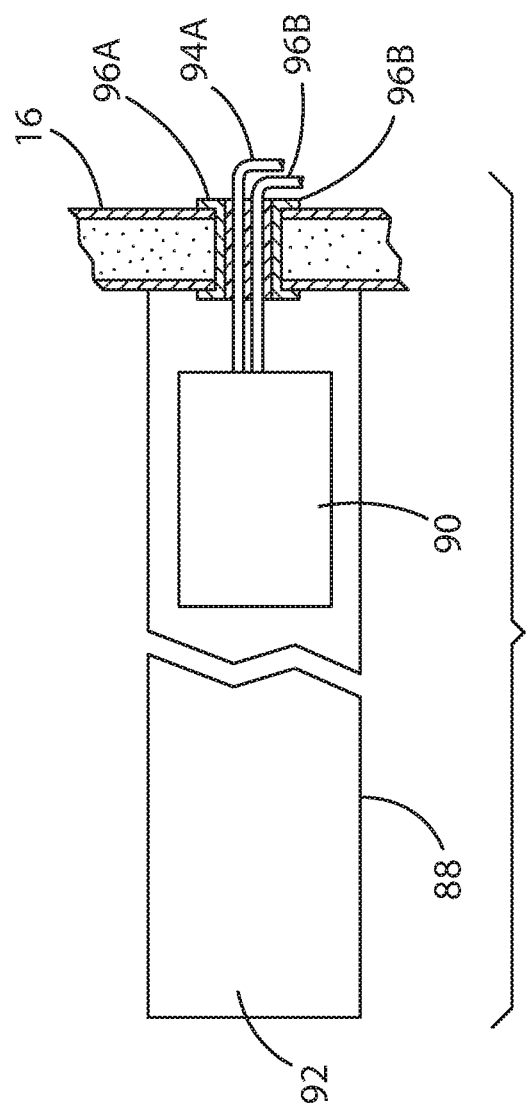
FIG. 9 is an enlarged view of a portion of the refrigerator of FIG. 7.

With further reference to FIGS. 7-9, refrigerator 1 may include a cooling system 84. The cooling system 84 may include an electrically powered compressor 86 and/or other components mounted in exterior component mounting space 28. Refrigerator 1 may also include a divider 88 disposed within interior space 19. Divider 88 is configured to receive mechanical equipment for operating various functions of the refrigerator. As an example, a cooling module 90 may be disposed within interior volume 92 of divider 88 to cool the compartments on opposite sides of divider 88. Examples of various cooling module sets are disclosed in U.S. patent application Ser. No. 13/108,226 entitled "COOLING SYSTEM INTEGRATION ENABLING A PLATFORM ARCHITECTURE" filed on May 16, 2011, now abandoned; U.S. patent application Ser. No. 13/108,293 entitled "FLEXIBLE COOLING SYSTEM INTEGRATION FOR MULTIPLE PLATFORMS" filed on May 16, 2011; and U.S. Pat. No. 8,820,112 entitled "UNIVERSAL AND FLEXIBLE COOLING MODULE SET (CMS) CONFIGURATION AND ARCHITECTURE" filed on May 16, 2011. Each of these patent applications is hereby incorporated by reference in their entirety. The cooling module 90 may be operably connected to compressor 86 and/or other components by utility lines 94A and 94B. The utility lines 94A and 94B pass through rear panel 16 at fittings 96A and 96B, respectively. The fittings 96A and 96B seal off the vacuum space 52 to ensure the space 52 maintains a vacuum. The utility lines 94A and 94B may comprise coolant lines, and cooling module 90 may comprise an evaporator and fan unit. Utility lines 94A and 94B may further comprise electrical lines to provide power for a fan of cooling module 90.

Referring to FIG. 8, utility lines 94A and 94B may also extend through third portion 26 of floor structure 18 at a fitting 96. If the utility lines 94A and 94B are routed into interior space 19 as shown in FIG. 8, the utility lines 94A and 94B may be routed directly adjacent inner surface 98 of first portion 12 of the cabinet structure 2, between liner 14 and one or more insulated panels 20A-20G. As discussed above, polyurethane foam or the like can be injected into the space between liner 14 and vacuum insulated panels 20A-20G. Accordingly, the utility lines 94A and 94B may be embedded in the polyurethane foam.

Figure 10:
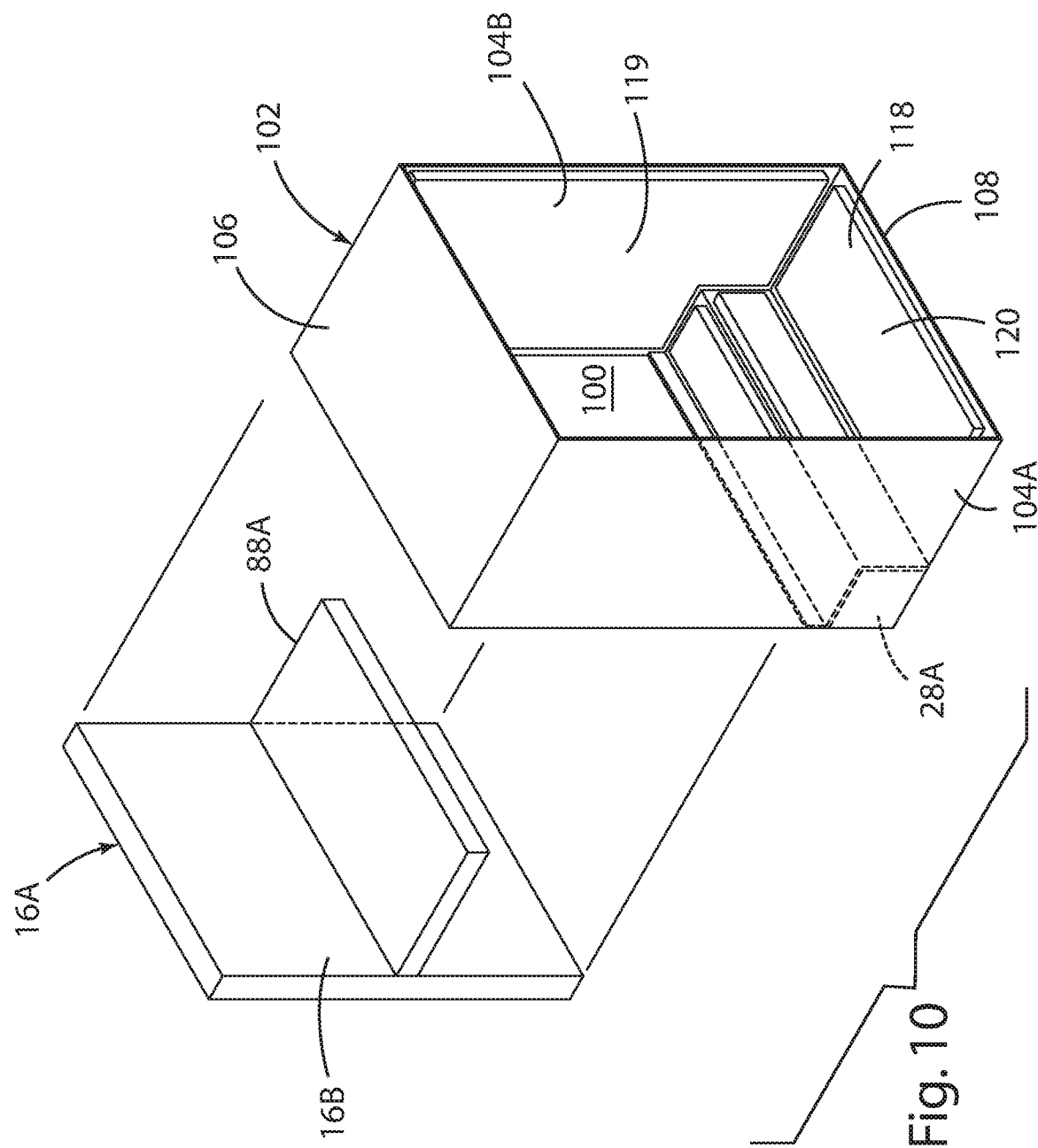
FIG. 10 is an exploded isometric view of a vacuum insulated cabinet structure according to another aspect of the present invention.

With further reference to FIG. 10, a vacuum insulated cabinet structure 102 according to another aspect of the present invention is constructed in a manner that is substantially similar to the vacuum insulated cabinet structure 2 described in more detail above. However, the insulated cabinet structure 102 includes a rear panel assembly 16A having a vertical panel portion 16B that may comprise a vacuum insulated panel, or it may comprise a conventional insulated panel having polyurethane foam disposed internally. Rear panel 16A may include a partition 88A that includes cooling modules (not shown) that are operably connected to a compressor (also not shown) that is disposed in an exterior space 28A. The vacuum insulated cabinet structure 102 may include a plurality of vacuum insulated panels 120 that are substantially similar to the vacuum insulated panels 20A-20G described in more detail above. The vacuum insulated cabinet structure 102 is fabricated in substantially the same manner as described in more detail above in connection with FIGS. 4-6. However, the blank 36 utilized to form vacuum insulated cabinet structure 102 does not include a panel region 46G (FIG. 4), such that an enlarged rear opening 100 is formed in vacuum insulated cabinet structure 102.

Figure 11:
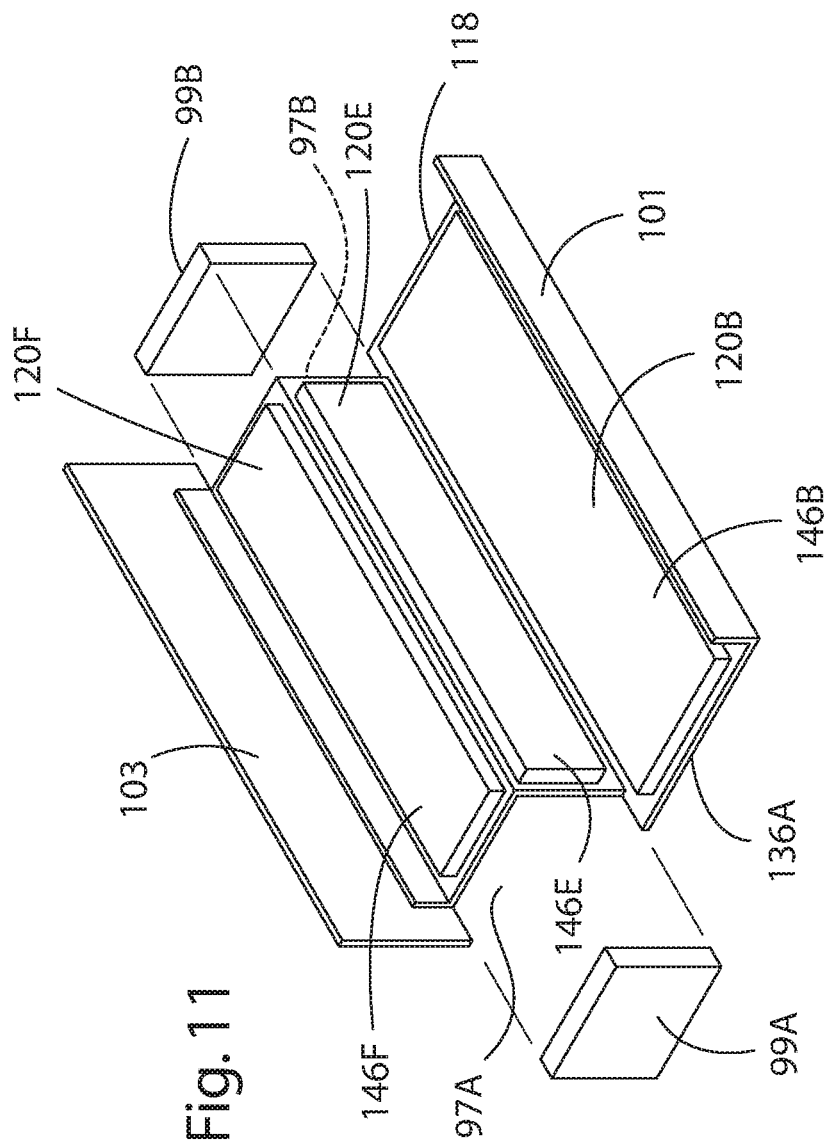
FIG. 11 is an exploded isometric view of a portion of the vacuum insulated structure of FIG. 10.

With further reference to FIG. 11, floor structure 118 may be formed from a separate blank 36A, and vacuum panels 120B, 120E and 120F may be formed at panel regions 146B, 146E and 146F. A front flange 101 may, when assembled, be connected to flange 78 of a liner 14 (FIG. 2), and an upright rear flange 103 may be connected to rear panel wall 16B. Panels 99A and 99B may be secured to the floor structure 118 to close off open ends 97A and 97B of exterior space 28A. The panels 99A and 99B may include one or more apertures (not shown) to provide for routing of utility lines from a compressor or other cooling system component disposed in exterior space 28A to a location within the interior space 119 of insulated cabinet structure 102. As discussed above, rear panel 16B may comprise a panel structure having inner and outer side walls with a polyurethane foam insulating material disposed in an interior space of the panel 16B. Utility lines from a compressor or other component disposed in exterior space 28A may be routed within panel 16B to an evaporator, fan, and/or other such components disposed within divider 88. A liner 14 (FIG. 2) may be inserted into interior space 119 (FIG. 10) of vacuum insulated cabinet structure 102.

FIGS. 12-19 show additional embodiments of refrigerators according to the present invention. FIGS. 12 and 13 show a refrigerator 201A, FIGS. 14 and 15 show a refrigerator 201B, FIGS. 16 and 17 show a refrigerator 201C, and FIGS. 18 and 19 show a refrigerator 201D. The insulated cabinet structures 202A-202D of refrigerators 201A-201D respectively, may comprise vacuum insulated cabinets constructed as described in more detail above in connection with FIGS. 1-11. Alternately, the insulated cabinet structures 202A-202D may include conventional insulation such as polyurethane foam or the like. The refrigerators 201A-201D include partitions 288A-288D that include cooling modules 290A-290D that provide independent cooling for compartments 210A-210D and 220A-220D formed on opposite sides of the partitions 288A-288D. For example, the compartments 210A-210D may comprise fresh food compartments that are maintained at a first temperature that is above freezing, and the compartments 220A-220D may comprise freezer compartments that are maintained at a temperature below freezing. Openings 205A-205D may be formed in the insulated cabinet structures 202A-202D to provide for venting of heated air produced by the cooling modules 290A-290D.

Refrigerators 201A-201D may include exterior spaces 228A-228D that are substantially similar to the space 28 described in more detail above in connection with FIGS. 1-9. A compressor (not shown) may be mounted in the spaces 228A-228D of refrigerators 201A-201D, and coolant lines (not shown) may be routed to the cooling modules 290A-290d through the insulated cabinet structure 202 as described in more detail above in connection with FIGS. 1-11. Alternately, the cooling modules 290A-290D may include a compressor, such that the compressor is not mounted in the external spaces 228A-228D. Alternately, cooling module 290A may comprise a thermoelectric cooling unit that does not include a compressor, such that substantially all of the components can be mounted within the modules 290A-290D.

With reference to FIGS. 12 and 13, refrigerator 201A includes an upper fresh food compartment 210A, and a lower freezer compartment 220A. With reference to FIGS. 14 and 15, refrigerator 201B includes a fresh food compartment 2106 and a freezer compartment 2206 that are disposed in a side-by-side configuration. With reference to FIGS. 16 and 17, refrigerator 201C includes an upper freezer compartment 220C and a lower fresh food compartment 210C. With reference to FIGS. 18 and 19, refrigerator 201D includes a fresh food compartment 210D and a freezer compartment 220D. Refrigerator 201D also includes a third compartment 225D. The third compartment 225D may be maintained at a third temperature that is not equal to the temperatures of compartments 210D and 220D. Third compartment 225D may be operably connected to compartments 210D and/or 220D by powered "air doors" (not shown) in partitions 288D and 214D. The air doors may be configured to open as required to permit airflow between third compartment 225D and compartments 210D and/or 220D to thereby control the temperature of third compartment 225D. The temperature of third compartment 225D may also be independently controlled utilizing other known arrangements.

The invention claimed is:

1. A method of routing coolant lines in a vacuum insulated refrigerator structure, the method comprising:
    forming a shell having an internal cavity, the shell having at least first and second openings to the internal cavity;
    forming an elongated umbilical comprising an elongated impervious sleeve and an elongated core structure disposed inside the sleeve, wherein the core structure defines at least two elongated internal passageways extending lengthwise along the umbilical, surrounding the core structure;
    sealingly connecting a first end of the sleeve to the shell at the first opening;
    sealingly connecting a second end of the sleeve to the shell at the second opening;
    forming a vacuum in the internal cavity of the shell; and
    routing coolant lines through the at least two elongated internal passageways whereby portions of the coolant lines are disposed inside the umbilical, and opposite ends of the coolant lines extend out of opposite ends of the umbilical.

2. The method of claim 1, wherein:
the elongated umbilical is formed into a linear configuration.

3. The method of claim 1, wherein:
the sleeve is formed into a linear configuration.

4. The method of claim 1, wherein:
the elongated core structure is formed into a linear configuration.

5. The method of claim 1, including:
routing electrical lines through the elongated umbilical.

6. The method of claim 5, including:
utilizing the electrical lines to provide electrical power to a fan of the cooling module.

7. The method of claim 1, including:
operably interconnecting a cooling module to a compressor utilizing the coolant lines.

8. The method of claim 1, wherein:
forming a shell includes forming an upright wall of a vacuum insulated refrigerator structure.

9. The method of claim 8, including:
positioning the elongated umbilical so that it extends horizontally through the upright wall.

10. The method of claim 1, wherein:
forming an elongated umbilical includes forming first and second fittings, and including:
sealingly connecting the first and second fittings to the shell to permit a vacuum to be maintained in the internal cavity.

11. The method of claim 1, wherein:
forming a shell includes forming a horizontally-extending shell structure; and including:
positioning the elongated umbilical such that the elongated umbilical extends vertically through the horizontally-extending structure.

12. The method of claim 11, including:
configuring the horizontally-extending shell structure for use as a floor structure of a vacuum insulated floor structure.

13. A method of routing utility lines in a vacuum insulated refrigerator structure, the method comprising:
    forming a shell having spaced apart first and second walls and an internal cavity between the first and second walls, wherein at least one of the first and second walls comprises a polymer material, and wherein at least one of the first and second walls comprises sheet metal, the shell having a first opening in the first wall to the internal cavity and a second opening in the second wall to the internal cavity;
    forming an elongated umbilical comprising an elongated impervious sleeve and an elongated core structure disposed inside the sleeve, wherein the core structure defines at least two elongated internal passageways extending lengthwise along the umbilical, surrounding the core structure;
    sealingly connecting a first end of the sleeve to the shell at the first opening;
    sealingly connecting a second end of the sleeve to the shell at the second opening;
    forming a vacuum in the internal cavity of the shell; and
    routing utility lines, including coolant lines, through the at least two elongated internal passageways whereby portions of the utility lines are disposed inside the umbilical, and opposite ends of the utility lines extend out of opposite ends of the umbilical.

14. The method of claim 13, wherein:
routing utility lines includes routing electrical lines.

* * * * *